United States Patent
Lang et al.

(10) Patent No.: US 11,691,497 B2
(45) Date of Patent: Jul. 4, 2023

(54) TRANSMISSION SYSTEM

(71) Applicant: DEERE & COMPANY, Moline, IL (US)

(72) Inventors: Matthias Lang, Mannheim (DE); David Mueller, Dettenheim (DE); Rainer Gugel, Plankstadt (DE)

(73) Assignee: DEERE & COMPANY, Moline, IL (US)

( * ) Notice: Subject to any disclaimer, the term of this patent is extended or adjusted under 35 U.S.C. 154(b) by 183 days.

(21) Appl. No.: 17/305,350

(22) Filed: Jul. 6, 2021

(65) Prior Publication Data
US 2022/0032763 A1    Feb. 3, 2022

(30) Foreign Application Priority Data

Jul. 29, 2020 (DE) .......................... 102020119984.8

(51) Int. Cl.
*B60K 6/442* (2007.10)
*B60K 6/365* (2007.10)
(Continued)

(52) U.S. Cl.
CPC .............. *B60K 6/442* (2013.01); *B60K 6/365* (2013.01); *B60K 6/54* (2013.01); *B60K 17/12* (2013.01);
(Continued)

(58) Field of Classification Search
CPC .......... B60K 6/442; B60K 6/365; B60K 6/54; B60K 17/12; B60K 2006/268;
(Continued)

(56) References Cited

U.S. PATENT DOCUMENTS 9,150,092 B2 * 10/2015 Murakami ............. H02K 51/00
9,490,687 B2 * 11/2016 Watanabe ............. B60W 10/06
(Continued)

FOREIGN PATENT DOCUMENTS

CN        108340766 A    7/2018
DE    102010022527 A1   12/2010
(Continued)

OTHER PUBLICATIONS

European Search Report issued in European Patent Application No. 21184936.9, dated Dec. 2, 2021, 8 pages.

*Primary Examiner* — John D Walters

(57) ABSTRACT

A transmission system suitable for operation with a drive machine includes an input shaft for a drive power, at least one output shaft for outputting drive power, a power-split transmission section having at least one variable transmission branch and a mechanical transmission branch, a manual transmission, a transmission system controller, and at least one first and second electric machine for generator and motor operation. The electric machines are electrically connected to one another. The drive power is divided up and conducted by the mechanical and variable transmission branch. An input-coupled, magnetically electric epicyclic gear stage brings together the variable transmission branch and mechanical transmission branch, and is activated by the second electric machine such that the output shaft of the transmission system rotates counter to a direction of rotation at the input shaft to provide a forward and reverse operation of the transmission system.

20 Claims, 12 Drawing Sheets

(51) Int. Cl.
  *B60K 6/54* (2007.10)
  *B60K 17/12* (2006.01)
  *F16H 37/00* (2006.01)
  *H02K 7/00* (2006.01)
  *H02K 49/10* (2006.01)
  *B60K 6/26* (2007.10)

(52) U.S. Cl.
  CPC ............. *F16H 37/00* (2013.01); *H02K 7/006* (2013.01); *H02K 49/102* (2013.01); *B60K 2006/268* (2013.01); *B60Y 2200/92* (2013.01); *B60Y 2400/73* (2013.01)

(58) Field of Classification Search
  CPC ..... B60Y 2200/92; F16H 37/00; H02K 7/006; H02K 49/102
  See application file for complete search history.

(56) References Cited

U.S. PATENT DOCUMENTS

| | | | |
|---|---|---|---|
| 10,959,366 B2 | 3/2021 | Lang et al. | |
| 11,034,239 B2 * | 6/2021 | Lang | ................ B60K 23/0808 |
| 11,231,097 B2 * | 1/2022 | Lang | ..................... F16H 48/38 |
| 2009/0247341 A1 | 10/2009 | Abe et al. | |
| 2019/0136953 A1 | 5/2019 | Lang et al. | |

FOREIGN PATENT DOCUMENTS

| | | |
|---|---|---|
| EP | 2179879 A1 | 4/2010 |
| EP | 3410588 A1 | 12/2018 |
| WO | WO2013121266 A1 | 8/2013 |

\* cited by examiner

TRANSMISSION SYSTEM

RELATED APPLICATIONS

This application claims priority to German Patent Application No. 102020119984.8, filed Jul. 29, 2020, the disclosure of which is hereby expressly incorporated by reference in its entirety.

FIELD OF THE DISCLOSURE

The present disclosure relates to a transmission system for an agricultural machine.

BACKGROUND

A conventional transmission system consists of an input shaft, a shiftable transmission and an output shaft. Transmission systems change the introduced drive power into torque and rotational speed and transmit same to the output.

A transmission system can use a manual transmission or a continuously variable transmission as components. Manual transmissions are realized by power-shiftable clutches which interconnect different meshing gearwheel stages. The shifting time, also called a power-shift point, leads to a change in speed of the meshing transmission system components, excess production of noise, wear and an interrupted power flux.

The transmission system can alternatively be realized as a continuously variable transmission. This is realized by hydraulic variators in order to be able to reliably convert a higher drive power. In this case, some of the drive power is converted on the input side of the continuously variable transmission into hydraulic power by hydrostatic drives. The proportion of the hydraulic power can be varied by the variators. On the output side, the hydraulic energy is converted into mechanical energy again. Continuously variable transmissions generally have an output shaft in order to simplify the design. At the shifting time of the transmission system, this requires a change in rotational speed at the variator output shaft at the same time as the gear change in the downstream transmission. This operation takes time which slows down the shifting operation and leads to inertia in the transmission system.

One possibility can be for the transmission system to be provided with a continuously variable transmission with two variator output shafts. This makes it possible to dispense with a change in rotational speed at the same time as the shifting operation. This type of design results in increased complexity because of the second variator output together with the greater number of components. Overall, these conventional transmission systems have an increased outlay on maintenance, together with increased wear and a greater production of noise.

There is a need therefore for a transmission system which overcomes the aforementioned problems.

SUMMARY

According to the present disclosure, a transmission system according to the present disclosure is suitable for operation with a drive machine, and includes an input shaft for the drive power, at least one output shaft for outputting same to a drive, a power-split transmission section, a manual transmission, a transmission system controller, wherein the power-split transmission section has at least one variable transmission branch and a mechanical transmission branch, and the variable branch has, on the input and output sides, in each case at least one electric machine for the generator and motor operation, which electric machines are electrically connected to one another. The drive power is divided up and conducted by the mechanical and variable branch, and with an input-coupled, magnetically electric epicyclic gear stage which brings together the variable branch and mechanical branch, with an inner rotor, an outer stator and a modulating ring, and the magnetically electric epicyclic gear stage can be activated by the second electric machine in such a manner that the output shaft of the transmission system rotates counter to the direction of rotation at an input shaft, as a result of which a forward and reverse operation of the transmission system can be carried out.

In the case of the transmission system according to the present disclosure and for use of electric machines in the variable branch together with a magnetically electric epicyclic gear stage, at the shifting point of the transmission the excitation frequency is simultaneously shifted into the stator windings of the magnetically electric epicyclic gear stage. This shifting causes a change in the rotational speed of an intermediate shaft. In this case, however, only a small torque is required, and therefore a more rapid shifting operation of the transmission system is possible than in the prior art, according to some embodiments. The shifting operations thus reduce the coordination complexity of the operator and reduce the duration of the shifting operation. The vehicle in this case is exposed to smaller speed fluctuations, and therefore increased driving comfort is ensured.

In a further embodiment, the magnetically electric epicyclic gear stage is activated by the second electric machine in such a manner that an output shaft of the magnetically electric epicyclic gear stage rotates in the opposite direction to the input shaft of the transmission system.

The activation of the magnetically electric epicyclic gear stage permits the rotational speed and direction of the input shaft to be superimposed on an output of the magnetically electric epicyclic gear stage, thus setting a resulting output rotational speed and direction of rotation of the output shaft in the opposite direction to the input shaft. An additional reverse gear can be omitted and the overall design of the transmission system is simplified, as a result of which the required number of parts and corresponding production and installation operations are reduced.

In a further embodiment, an additional module for reversal of the direction of rotation is provided in the power flux between the first electric machine and the magnetically electric epicyclic gear stage.

The module for the reversal of direction of rotation can be formed separately from the manual transmission. The complexity is therefore reduced. The module can be configured for a smaller torque, thus reducing the production complexity and weight of the components.

In one development, one speed of the manual transmission is an additional reverse gear.

Compatibility with conventional manual transmissions is produced by integrating the reverse gear in the manual transmission. The necessary construction space for the power-split transmission section is reduced.

In one embodiment, an additional module for reversal of the direction of rotation is provided in the power flux between the magnetically electric epicyclic gear stage and the manual transmission.

The separate arrangement facilitates the accessibility of the module for maintenance purposes.

In one development, an additional module for serially electric starting is provided in the power flux.

The module permits the starting of the vehicle by the electric power branch which corresponds to the power flow via the two electric machines while simultaneously switching off the mechanical power branch. The purely electric starting enables a high torque to be conducted to the output. This is of advantage particularly when starting with a high traction torque of the vehicle since high tensile forces have to be applied here at a low travel speed. This is ensured by the module.

In one embodiment, the module for serially electric starting is provided in the power flux between the input shaft of the transmission system and the magnetically electric epicyclic gear stage.

The module enables the primary drive to be mechanically decoupled from the output of the vehicle. The drive power is converted into electric power and conducted to the output. The module, by being provided in the power flux upstream of the magnetically electric epicyclic gear stage, can be arranged within the power-split transmission section. The electric machines can be used here for the conversion and output.

In one development, the module for serially electric starting is provided in the power flux between the first electric machine and the magnetically electric epicyclic gear stage.

The module, by being provided in the power flux upstream of the magnetically electric epicyclic gear stage, can be arranged within the power-split transmission section. The electric machines can be used here for the conversion and output.

In one development, the module for serially electric starting is provided in the power flux between the module for reversal of direction of rotation and the magnetically electric epicyclic gear stage.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
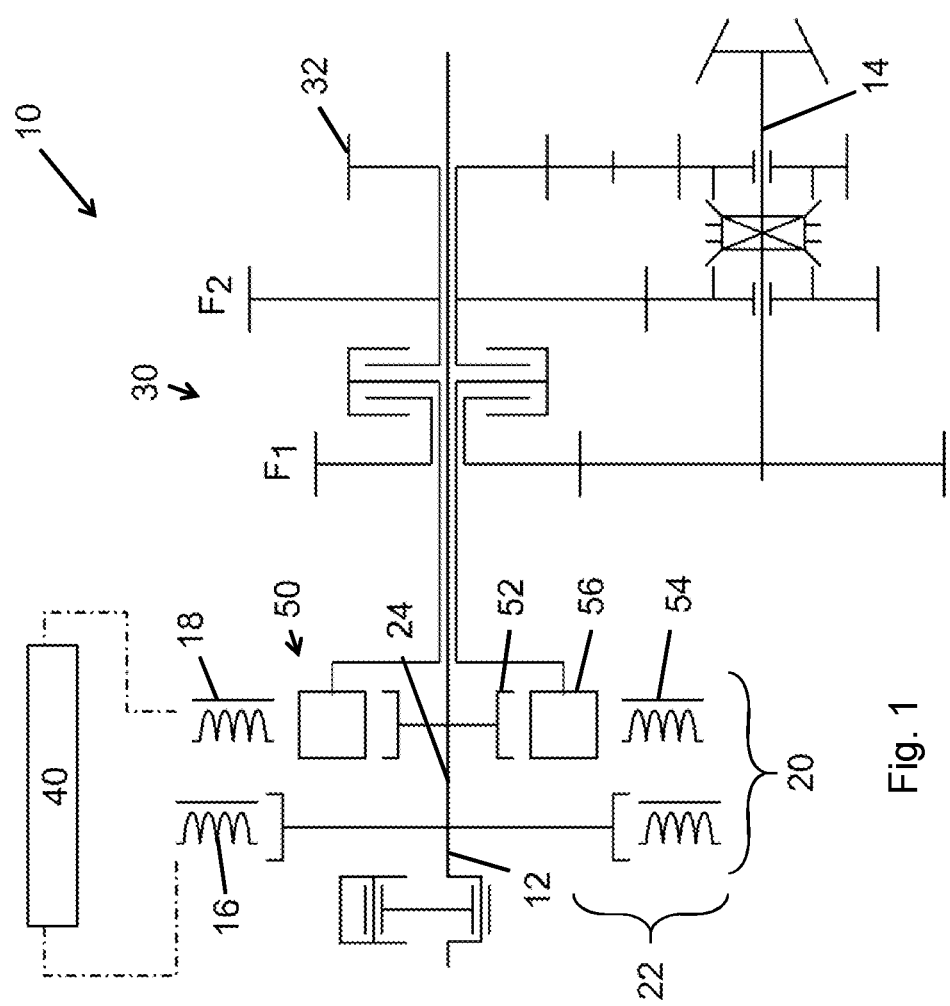
FIG. 1 shows a design of the transmission system according to the present disclosure.

FIG. 1 illustrates an embodiment of the transmission system 10. Drive power is transmitted by a drive, generally an internal combustion engine, to an input shaft 12. However, the drive machine may also be a hydraulic motor. A rotor of the input-side electric machine is connected to the input shaft 12 for rotation therewith, as is the inner rotor 52 of the magnetically electric epicyclic gear stage 50. The input shaft is used at the same time for supplying drive power for a power take-off or PTO and is designed as a continuous shaft.

The input-side electric machine 16 is electrically connected to the output-side electric machine 18 and to a transmission system controller 40. The output-side electric machine 18 is operatively connected to the modulating ring 56 of the magnetically electric epicyclic gear stage 50, the ring in turn interacting with the inner rotor 52. The input-side and output-side electric machine together with the magnetically electric epicyclic gear stage constitute the variable transmission branch 24 and, together with the input shaft, the power-split transmission section 20. The mechanical transmission branch 24 is formed from the continuous input shaft 12.

The modulating ring 56 is connected subsequently in the power flux by a hollow shaft which surrounds the input shaft 12. The hollow shaft is connected to the manual transmission 30 and is connectable to a first gearwheel pair F1 or a further gearwheel pair F2 by a power-shift clutch. The gearwheel pairs F1 and F2 form the manual transmission 30 of the transmission system 10. The gearwheel pairs F1 and F2 transmit the drive power to the output shaft 14 which is used in turn for transmitting same to the output. The second gearwheel pair F2 is not connected to the output shaft 14 for rotation therewith, but rather is connected thereto for rotation therewith by shifting via a coupling element. The first gearwheel pair F1 is connected to the output shaft 14 for rotation therewith, and therefore, during freewheeling of the coupling element and with a corresponding position of the power-shift clutch in the manual transmission, the drive torque is conducted via the first gearwheel pair F1.

A further gearwheel pair R for a reverse gear can be connected to the second gearwheel pair F2. The direction of rotation is reversed by an additional intermediate shaft between the input shaft 12 and the output shaft 14. On the output shaft, the gearwheel pair R is not connected to the output shaft 14 for rotation therewith and is shifted by the coupling element. Therefore, depending on the position of the coupling element and the power-shift clutch, the first gearwheel pair F1, the second gearwheel pair F2 or the reverse gear R is placed at the output.

The drive power is divided up in the power-split transmission section 20 by activation of the input-side electric machine 16 and a corresponding portion is converted into electric power. The remaining mechanical portion is conducted through the input shaft 12 or remains in the latter. The electric power is controlled by the transmission system controller 40 and activates the output-side electric machine 18 and supplies the same with electric power. Control of current and voltage makes it possible to influence the torque which is generated and the rotational speed, and therefore the action of the modulating ring 56 and the inner rotor 52 enables an outgoing rotational speed and an outgoing torque to be set at the modulating ring 56.

The portion of remaining power in the input shaft is conducted to the power take-off while the further portion is conducted to the manual transmission.

At a shifting time, upon corresponding activation by the transmission system controller, one of the power-shift clutches for F1 or F2 is closed while the respective other power-shift clutch is opened. At the same time, the coupling element is shifted over on the output shaft 14. Without the present disclosure, the change in the power path and the resulting rotational speed and the torque would cause the transmission system to change the moment of inertia such that the operator can feel this change. At the same time, the vehicle experiences a change in speed.

In order to prevent this, it is provided according to the present disclosure that the electric drive power is adapted at the same time as the shifting operations in the manual transmission 30 in such a manner that the transmission system controller 40 changes the excitation frequency of the windings in the outer stator 54 of the magnetically electric epicyclic gear stage 54. The change itself does not cause any torque or change in rotational speed, and therefore the change in the moment of inertia of the transmission system is kept very small. This reduction means that the vehicle does not undergo any perceptible change in speed.

The input torque is simultaneously applied to the first electric machine 16 and to the inner rotor 52 via the input shaft 12. The first electric machine 16 converts the input torque into electric power, with the activation taking place via the transmission system controller 40. The electric power is output via the second electric machine 18 with an outer stator 54. A change in the excitation frequency enables different rotational speeds to be set in the magnetically electric epicyclic gear stage. The power applied at the inner rotor 52 and the power applied at the outer stator 54 result in the power which arises at the modulating ring 56. The power is output via the modulating ring 56 to the manual transmission 30 and, by shifting of the respective clutches, is conducted via the gearwheel pairs F1, F2 or R.

Overall, the transmission system is capable at the shifting time of compensating for a simultaneous change in the rotational speed in the magnetically electric epicyclic gear stage 50 by the pulse which arises and of obtaining a harmonious, non-jerky operation during shifting operations.

The transmission system 10 can simultaneously permit purely electric starting since there is no mechanical connection between the drive and the output. The provision of a battery storage and the feeding of additional electrical energy to the second electric machine 18 thus enables pure electric starting to be achieved. This takes place in the module for serially electric starting 70. This is particularly of advantage in the case of a high trailer load, which normally requires a large gear reduction at low travel speeds for starting purposes.

Figure 2:
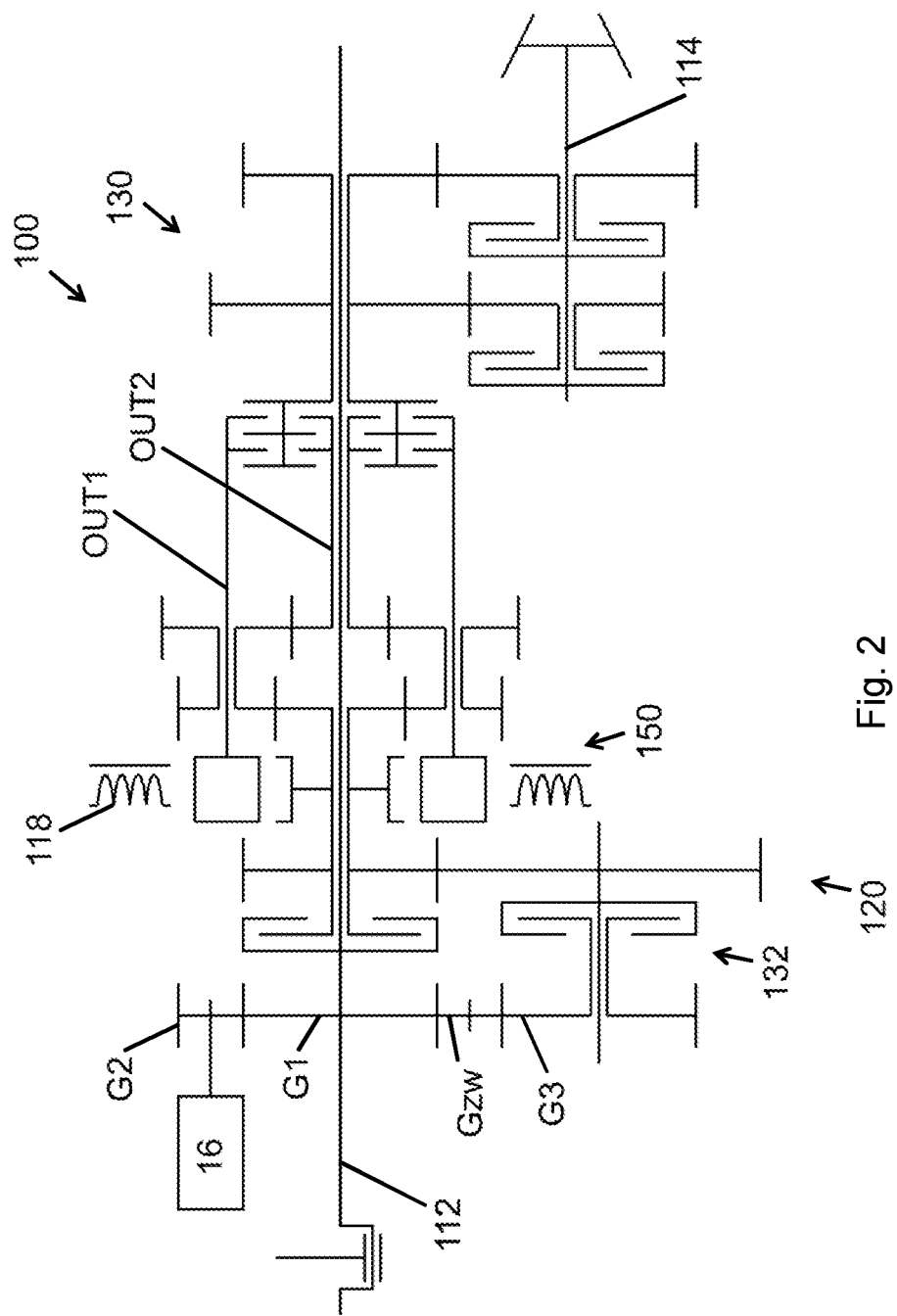
FIG. 2 shows a design from the prior art.

FIG. 2 describes a known, power-split transmission system from the prior art which has a variable branch with two outputs 1 and 2.

The drive power is conducted via the input shaft 112 to a first gearwheel G1 and is conducted by the further gearwheels G2 and $G_{zw}$ or G3 in each case to a first electric machine 116 and to a reverse gear 132.

The variable proportion of power is electrically transmitted to a second electric machine 118 and is combined again with the mechanical power by a magnetically electric epicyclic gear stage 150. In contrast to the present disclosure, the transmission system according to the prior art has two outputs OUT1 and OUT2 which, depending on the application, can be connected to the output by a power-shift clutch. The drive power is subsequently conducted through a manual transmission 130, wherein different gear transmission ratios are defined by two clutches.

The solution by two outputs downstream of the power-split transmission enables shifting of the outputs at the same time as the power-shift clutches in the manual transmission 130 are shifted. By this, together with the change in the rotational speed and the torque in the manual transmission 130, the rotational speed and the torque at the output of the power-split transmission section 120 is changed. This compensates for the pulse at the shifting time. In contrast to the present disclosure, the design of the transmission system 100 is substantially more complex. Two outputs of the power-split transmission section have to be provided, together with two power-shift clutches and two additional planetary stages. At the same time, the controller of the transmission system 130 is configured in such a manner that a shift can be made only between two different rotational speed ratios, according to some embodiments. Overall, this results in greater manufacturing complexity, a greater number of components and an increased weight.

Figure 3:
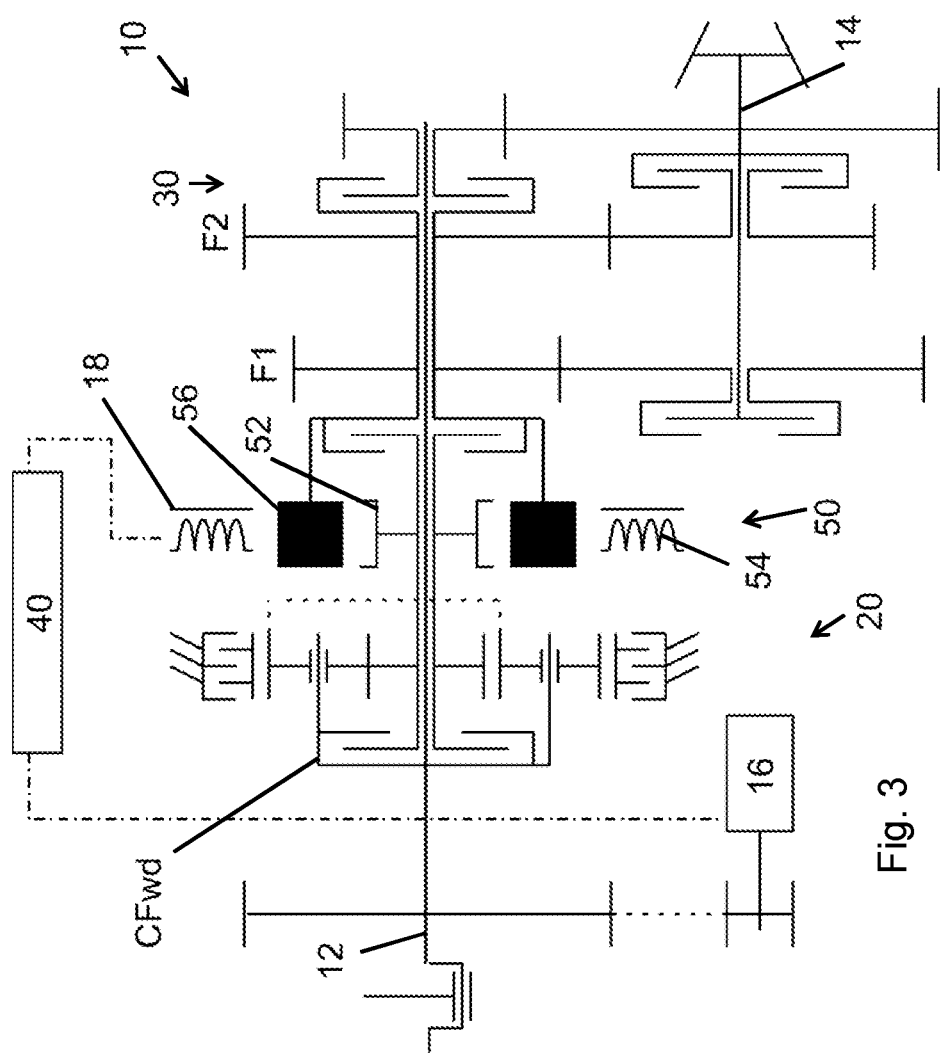
FIG. 3 shows a further design of the transmission system according to the present disclosure.

FIG. 3 shows a further exemplary embodiment of the transmission system according to the present disclosure. The first electric machine 16 is driven here via a shaft of a gearwheel which is supplied with the input torque at a constant transmission ratio. From the input shaft 12, the drive power is introduced into the planet carrier of an epicyclic gear. The latter has a blockable outer ring and has a power-shift clutch with which the planet carrier can be coupled to the sun. The output of the planetary transmission likewise takes place via the sun, and therefore the drive power furthermore takes place in parallel via the input shaft 12 and the sun shaft. Further downstream in the power path, the variable power portion is introduced by the second electric machine 18 and a further sun gear of the magnetically electric epicyclic gear stage 50, wherein the modulable ring 56 can be coupled by a further power-shift clutch to the inner rotor in the function as a sun gear. Regulation of the variable power portion takes place here between the first and second electric machine 16 and 18. A subsequent manual transmission 30 with a further parallel shaft is connected to the output. The manual transmission has two gearwheel pairings F1 and F2 which can be coupled to the sun shaft by power-shift clutches. The input shaft 12 is used for supplying the power take-off or PTO. In addition, a further reduced speed is provided as a slow travel speed or creep.

The reverse gear in the transmission system 10 is provided by closing or opening the power-shift clutch $C_{Fwd}$, as a result of which a reversal of the direction of rotation takes place at the sun gear or at the sun shaft of the planetary transmission.

FIGS. 4 to 12 show a schematic design of further embodiments of the transmission system 10 according to the present disclosure. The individual components correspond in design to those of FIGS. 1 and 3.

Figure 4:
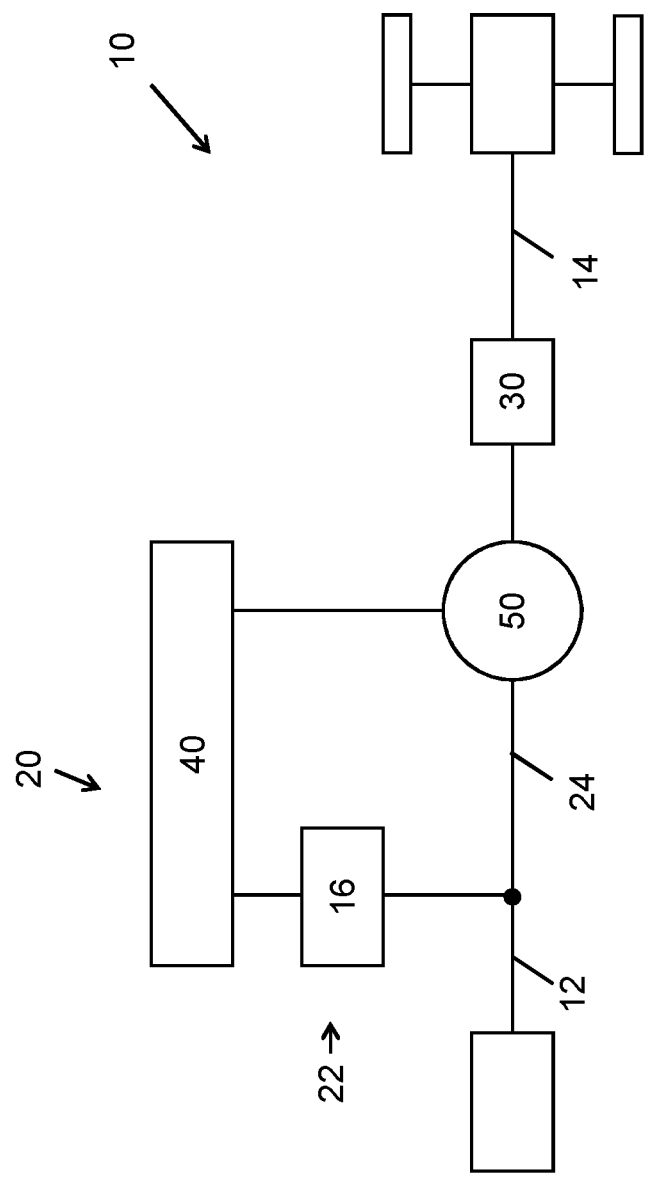
FIG. 4 shows a further schematic design of the transmission system.

FIG. 4 shows a transmission system 10 according to the present disclosure according to FIG. 1, wherein the embodiment does not have a separate reverse gear. The drive torque is divided up between the mechanical transmission branch 24 and the variable transmission branch 22 which consists of the first and second electric machines 16 and 18. The second electric machine 18 is part of the magnetically electric epicyclic gear stage 50. The manual transmission 30 is formed downstream in the power path. From the manual transmission, the drive power is conducted into one or more axles of the vehicle and finally to the output.

Figure 5:
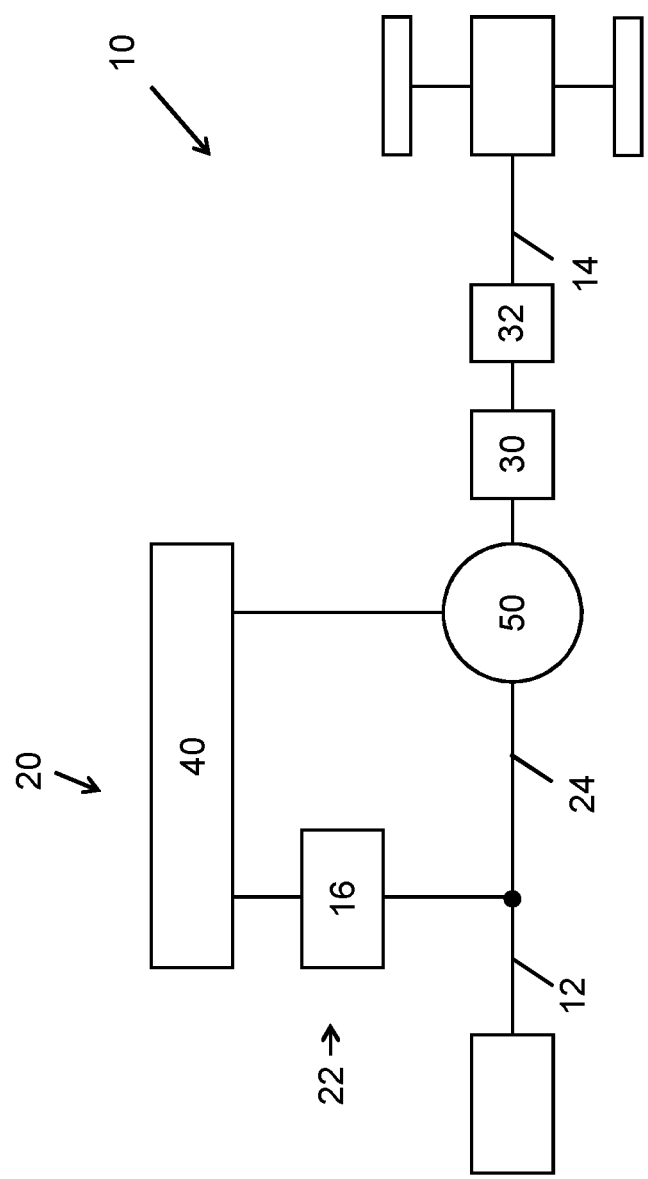
FIG. 5 shows a further schematic design of the transmission system.

FIG. 5 shows an embodiment in which the transmission system 10 additionally has a reverse gear 32 which is provided in the power path between the manual transmission 30 and the vehicle axles.

Figure 6:
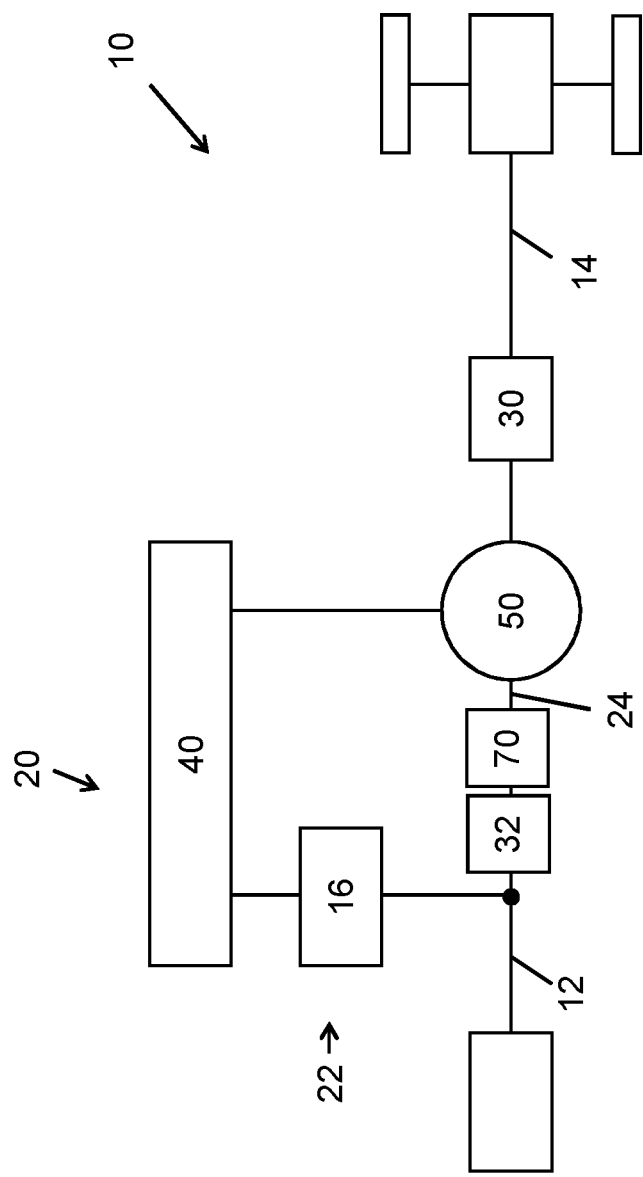
FIG. 6 shows a further schematic design of the transmission system.

FIG. 6 shows an embodiment in which the reverse gear 32 is formed in the power path in the region between the first electric machine 16 and the magnetically electric epicyclic gear stage 50. In addition, a module for serially electric starting 70 is provided in the power path, which permits starting of the vehicle without direct mechanical coupling of the drive to the output.

Figure 7:
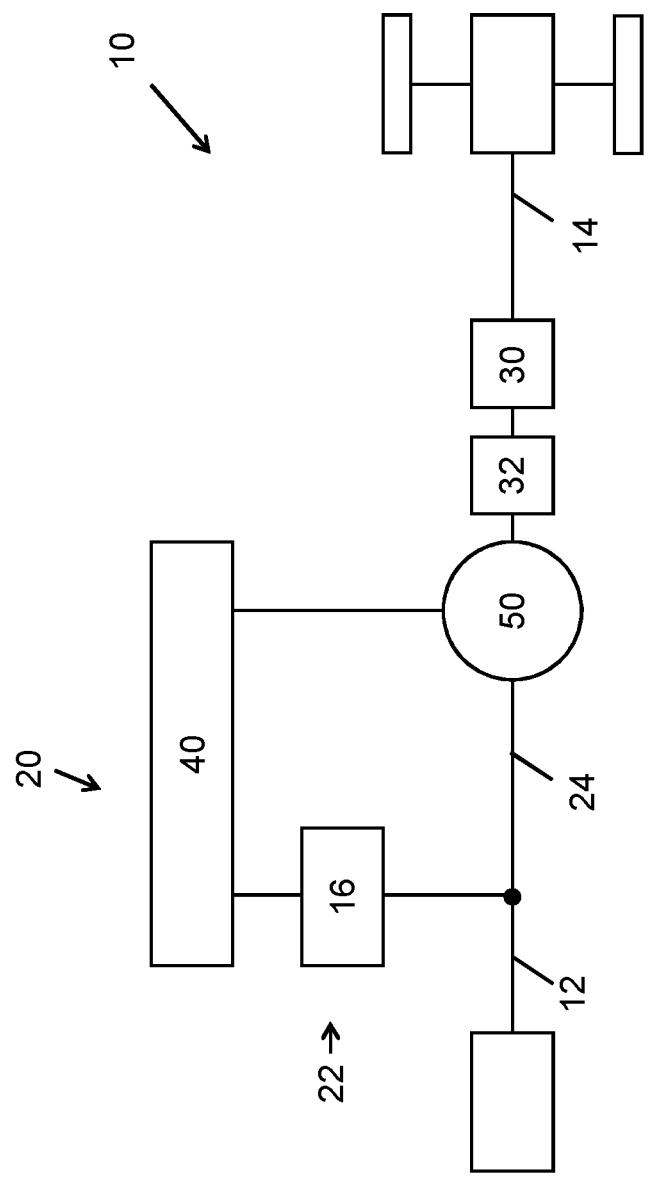
FIG. 7 shows a further schematic design of the transmission system.

FIG. 7 describes an embodiment in which the reverse gear 32 is formed in the power path between the magnetically electric epicyclic gear stage 50 and the manual transmission 30.

Figure 8:
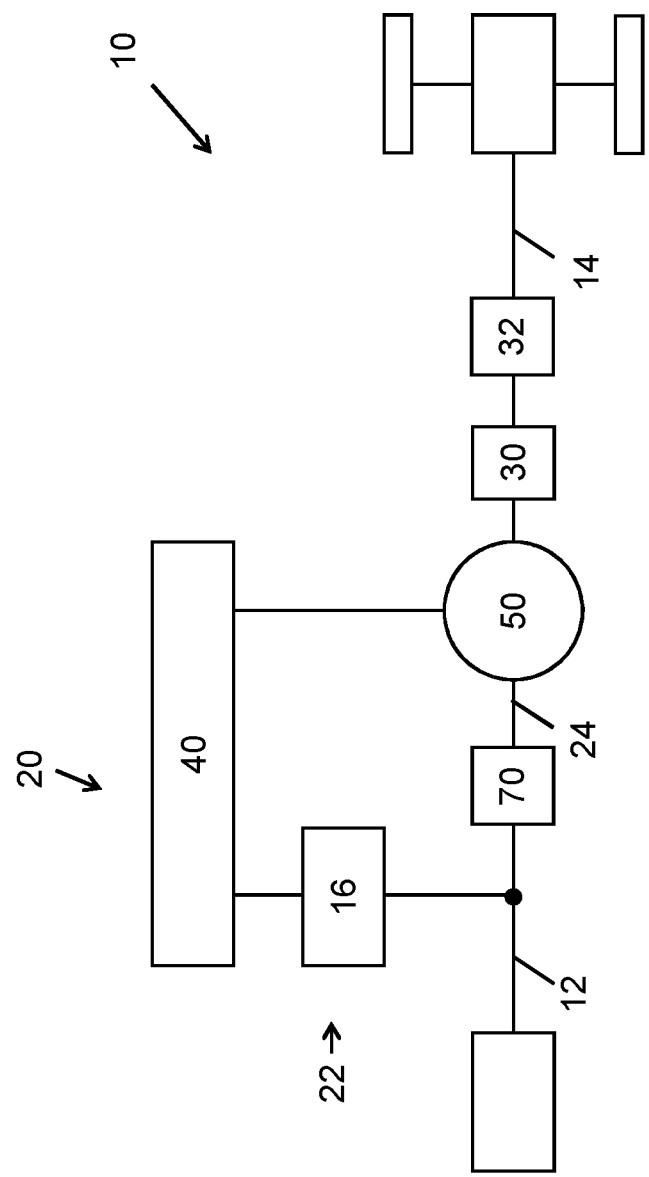
FIG. 8 shows a further schematic design of the transmission system.

FIG. 8 shows an embodiment in which the module for serially electric starting 70 is provided in the power path between the first electric machine 16 and the magnetically electric epicyclic gear stage 50. Furthermore, the reverse gear 32 is formed between the manual transmission 30 and the vehicle axles.

Figure 9:
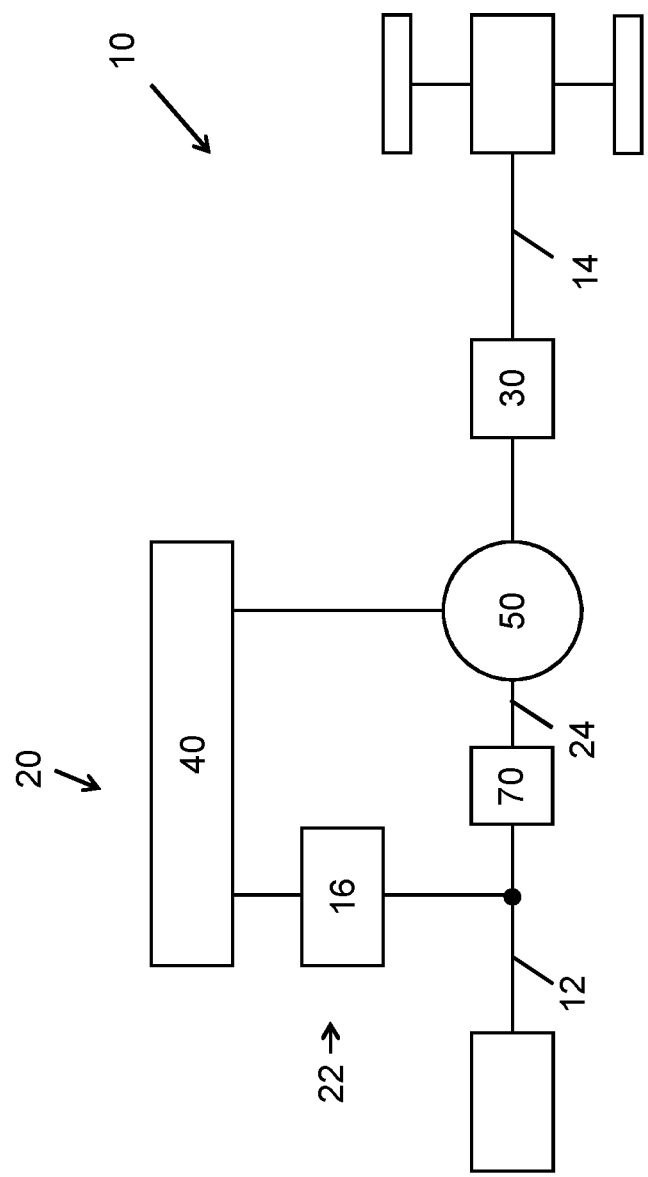
FIG. 9 shows a further schematic design of the transmission system.

FIG. 9 describes an embodiment with the module for serially electric starting 70 according to FIG. 8, wherein a reverse gear has been omitted. The latter is formed via the magnetically electric epicyclic gear stage 50, and therefore a reversal of the direction of rotation is present at the output of the magnetically electric epicyclic gear stage 50.

Figure 10:
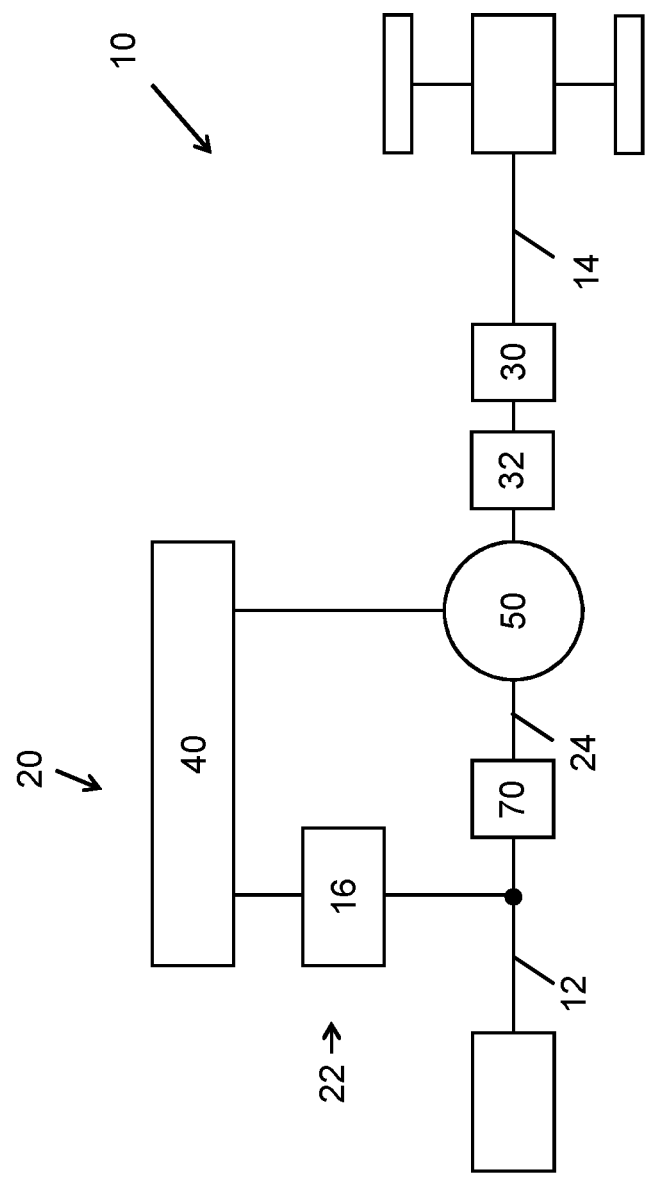
FIG. 10 shows a further schematic design of the transmission system.

FIG. 10 shows a further embodiment, wherein the module for serially electric starting 70 is formed in the power path between the first electric machine 16 and the magnetically electric epicyclic gear stage 50. The reverse gear 32 is provided in the power path between the magnetically electric epicyclic gear stage 50 and the manual transmission 30.

Figure 11:
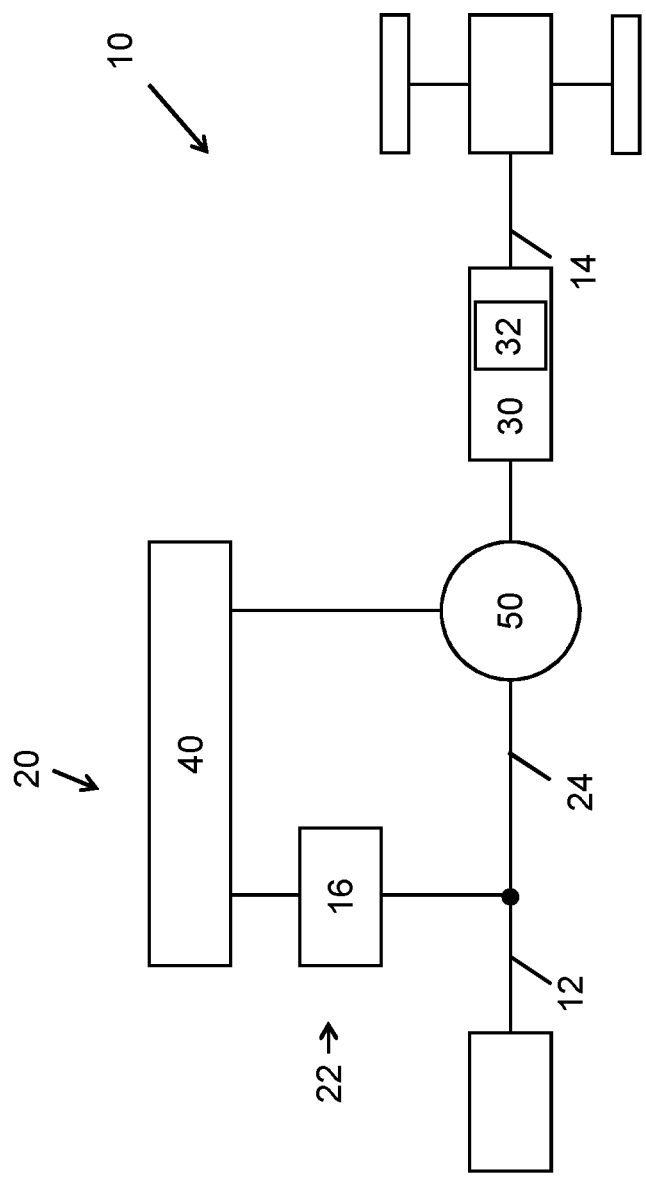
FIG. 11 shows a further schematic design of the transmission system.

FIG. 11 shows an embodiment in which the reverse gear 32 is formed within the manual transmission 30.

Figure 12:
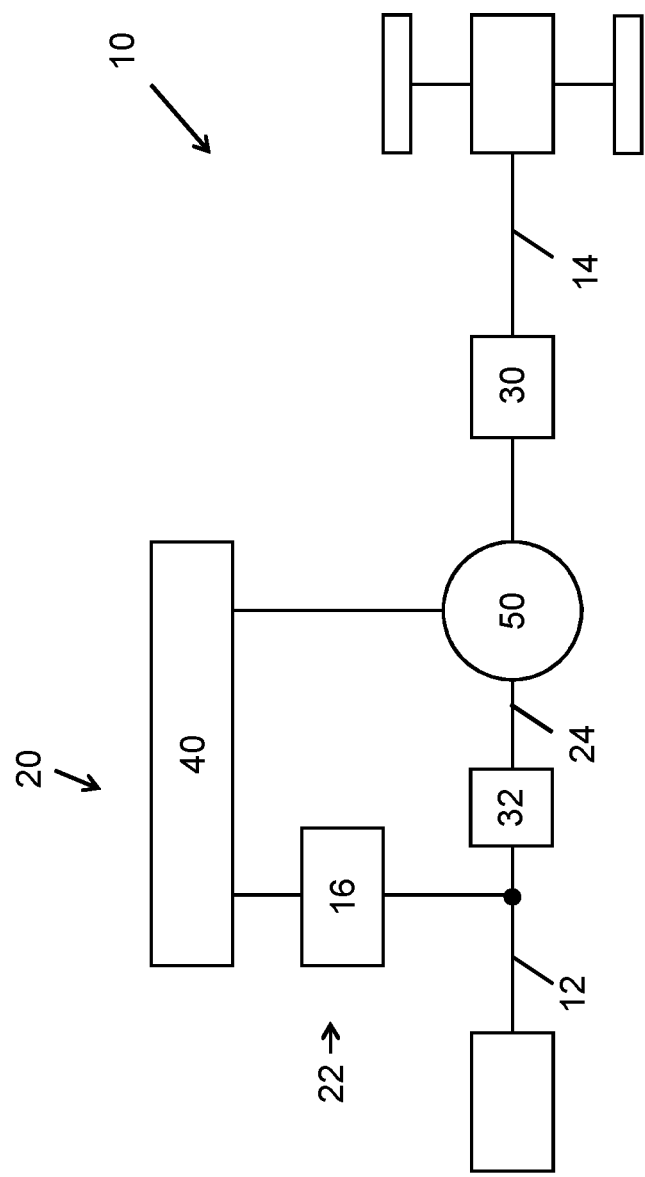
FIG. 12 shows a further schematic design of the transmission system.

FIG. 12 shows an embodiment with the reverse gear 32 in the power path between the first electric machine 16 and the magnetically electric epicyclic gear stage 50.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A transmission system suitable for operation with a drive machine, comprising:
   an input shaft for a drive power,
   at least one output shaft for outputting drive power to a drive,
   a power-split transmission section comprising at least one variable transmission branch and a mechanical transmission branch, the variable transmission branch having an input side and an output side,
   a manual transmission,
   a transmission system controller,
   at least one first and second electric machine for generator and motor operation, the electric machines being electrically connected to one another,
   wherein, the drive power is divided up and conducted by the mechanical and variable transmission branch,
   wherein, an input-coupled, magnetically electric epicyclic gear stage brings together the variable transmission branch and mechanical transmission branch, with an inner rotor, an outer stator and a modulating ring,
   wherein, the magnetically electric epicyclic gear stage is activated by the second electric machine such that the output shaft of the transmission system rotates counter to a direction of rotation at the input shaft to provide a forward and reverse operation of the transmission system.

2. The transmission system as claimed in claim 1, wherein the magnetically electric epicyclic gear stage is activated by the second electric machine such that an output shaft of the magnetically electric epicyclic gear stage rotates in the opposite direction of the input shaft of the transmission system.

3. The transmission system as claimed in claim 1, further comprising a module for reversal of the direction of rotation provided in a power flux between the first electric machine and the magnetically electric epicyclic gear stage.

4. The transmission system as claimed in claim 1, wherein one speed of the manual transmission comprises an additional reverse gear.

5. The transmission system as claimed in claim 1, further comprising an additional module for reversal of the direction of rotation provided in a power flux between the magnetically electric epicyclic gear stage and the manual transmission.

6. The transmission system as claimed in claim 1, further comprising a module for serially electric starting.

7. The transmission system as claimed in claim 6, wherein the module for serially electric starting is provided in a power flux between the input shaft of the transmission system and the magnetically electric epicyclic gear stage.

8. The transmission system as claimed in claim 6, wherein the module for serially electric starting is provided in the power flux between the first electric machine and the magnetically electric epicyclic gear stage.

9. The transmission system as claimed in claim 6, wherein the module for serially electric starting is provided in a power flux between a module for reversal of a direction of rotation and the magnetically electric epicyclic gear stage.

10. A transmission system suitable for operation with a drive machine, comprising:
   an input shaft for receiving a drive power,
   at least one output shaft for outputting drive power to a drive,
   a power-split transmission section comprising at least one variable transmission branch and a mechanical transmission branch, the variable transmission branch having an input side and an output side,
   a manual transmission,
   at least one first and second electric machine for generator and motor operation, the first and second electric machines being electrically connected to one another, and
   a magnetically electric epicyclic gear stage comprising an inner rotor, an outer stator and a modulating ring,
   wherein, the drive power is divided and conducted by the mechanical and variable transmission branches of the power-split transmission section, wherein, the magnetically electric epicyclic gear stage connects the variable transmission branch and mechanical transmission branch, wherein, the magnetically electric epicyclic gear stage is activated by the second electric machine such that the output shaft of the transmission system rotates counter to a direction of rotation at the input shaft to provide a forward and reverse operation of the transmission system.

11. The transmission system as claimed in claim 10, wherein the magnetically electric epicyclic gear stage is activated by the second electric machine such that an output shaft of the magnetically electric epicyclic gear stage rotates in the opposite direction of the input shaft of the transmission system.

12. The transmission system as claimed in claim 10, further comprising a module for reversal of the direction of rotation provided in a power flux between the first electric machine and the magnetically electric epicyclic gear stage.

13. The transmission system as claimed in claim 10, wherein one speed of the manual transmission comprises an additional reverse gear.

14. The transmission system as claimed in claim 10, further comprising an additional module for reversal of the direction of rotation provided in a power flux between the magnetically electric epicyclic gear stage and the manual transmission.

15. The transmission system as claimed in claim 10, further comprising a module for serially electric starting.

16. The transmission system as claimed in claim 15, wherein the module for serially electric starting is provided in a power flux between the input shaft of the transmission system and the magnetically electric epicyclic gear stage.

17. The transmission system as claimed in claim 15, wherein the module for serially electric starting is provided in the power flux between the first electric machine and the magnetically electric epicyclic gear stage.

18. The transmission system as claimed in claim 15, wherein the module for serially electric starting is provided in a power flux between a module for reversal of a direction of rotation and the magnetically electric epicyclic gear stage.

19. A transmission system suitable for operation with a drive machine, comprising:
an input shaft for receiving a drive power,
at least one output shaft for outputting drive power to a drive,
a power-split transmission section comprising at least one variable transmission branch and a mechanical transmission branch, the variable transmission branch having an input side and an output side,
a manual transmission,
at least one first and second electric machine for generator and motor operation, the first and second electric machines being electrically connected to one another,
a magnetically electric epicyclic gear stage comprising an inner rotor, an outer stator and a modulating ring,
a first module for reversal of the direction of rotation provided in a power flux between the first electric machine and the magnetically electric epicyclic gear stage
a second module for reversal of the direction of rotation provided in a power flux between the magnetically electric epicyclic gear stage and the manual transmission, and
a third module for serially electric starting,
wherein, the drive power is divided and conducted by the mechanical and variable transmission branches of the power-split transmission section,
wherein, the magnetically electric epicyclic gear stage connects the variable transmission branch and mechanical transmission branch,
wherein, the magnetically electric epicyclic gear stage is activated by the second electric machine such that the output shaft of the transmission system rotates counter to a direction of rotation at the input shaft to provide a forward and reverse operation of the transmission system.

20. The transmission system as claimed in claim 19, wherein the third module for serially electric starting is provided in (1) a power flux between the input shaft of the transmission system and the magnetically electric epicyclic gear stage, (2) a power flux between the first electric machine and the magnetically electric epicyclic gear stage, or (3) a power flux between a module for reversal of a direction of rotation and the magnetically electric epicyclic gear stage.

* * * * *